May 25, 1926.                                                   1,586,144
H. J. J. M. DE R. DE BELLESCIZE
STATION FOR DUPLEX WIRELESS TELEGRAPHY
Filed August 18, 1919

Inventor
H.J.J.M. DE R. DE BELLESCIZE
By his Attorney
Herbert T. Kerslake

Patented May 25, 1926.

1,586,144

UNITED STATES PATENT OFFICE.

HENRI JEAN JOSEPH MARIE DE REGNAULD DE BELLESCIZE, OF TOULON, FRANCE.

STATION FOR DUPLEX WIRELESS TELEGRAPHY.

Application filed August 18, 1919. Serial No. 318,368.

Wireless stations equipped for duplex working, that is to say, for simultaneous transmission and reception of messages, comprise each a separate transmitting apparatus and a receiving apparatus, these two apparatuses being connected together by a line (telegraphic, telephonic or service lines) serving to carry on the service.

The difficulty in the working of such stations is due to the disturbing effect of the transmitting apparatus upon the receiving apparatus of the same station which is still intended to continue to listen during the transmission.

It has been proposed hitherto to remedy this difficulty by the separate or combined use of various methods hereinafter referred to, which are however attended by the following drawbacks:—

1. A rather considerable distance is necessary between the transmitting and receiving apparatuses of the same station (it has not been possible hitherto to obtain good results with a distance under 30 kilometres in the case of stations for transatlantic communications). This distance is a drawback to the facility of the operation of the station.

2. For the two stations working in duplex very different transmission wave lengths (at least 10%) must be chosen.

It is to be noted that the adoption of the same wave length or of very nearly equal wave lengths for the two simultaneous transmissions would have two important advantages, namely: (1) the interference occasioned at other wireless receiving stations tuned to a different wave length would be diminished, and (2) the other stations would be prevented from intercepting at least one (if not both) of the series of signals exchanged on the same wave. This interception will be more particularly prevented in the case of stations which do not have closely selective receiving capabilities, and to stations situated in proximity to the plane of the two cooperating duplex stations. This latter advantage is important in time of war in order to prevent the interception by the enemy stations.

(3) With the use at each of the two stations equipped for duplex working, of a transmitting aerial and of a receiving aerial both constructed and directed in such a manner that the radiation of each aerial is a minimum in the direction of the other aerial and is a maximum in the direction of the other station with which communication is to be established, it has been found that the open or closed aerials employed hitherto are very imperfectly constructed and directed for this purpose, and that there is no direction in which their radiation or their own sensitiveness can be considered as being practically nil.

(4) It is also known to utilize a small open compensating aerial directed horizontally at right angles to the bearing of the distant transmitting station, and consequently at right angles to the receiving aerial to which it is inductively coupled by means of a coil.

It is to be noted also that duplex receiving over long distances has been done already on an open aerial.

The present invention consists in improvements in wireless stations for duplex working designed to do away with the drawbacks of the devices hereinbefore referred to.

In order to cancel the disturbing effect of the transmitting apparatus upon the receiving apparatus of one and the same station, one or the other of the following conditions or their combination must be established according to the present invention.

In the accompanying drawing, wherein a practical embodiment of the invention is illustrated, Figure 1 shows the assembled apparatus diagrammatically, E indicating the emitter or sending station, B the receiver D' and D² a compensating device.

Figure 2:
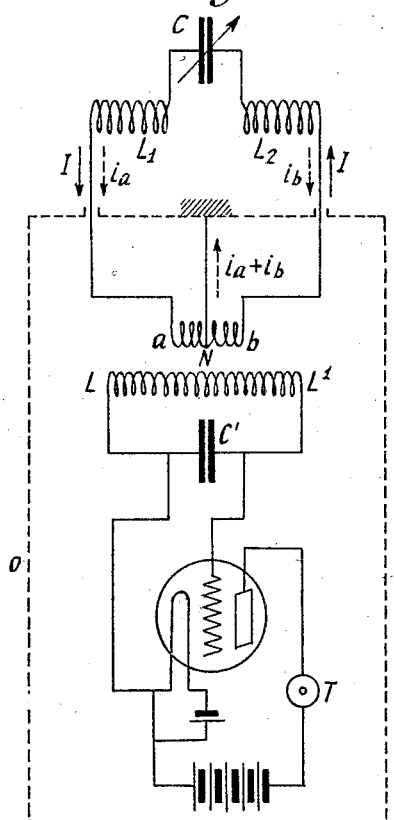
Fig. 2 is a detail of the receiver element.

1. The receiver antenna is formed of a closed frame, rotatable about a vertical axis, and mounted as indicated in Fig. 2. It comprises a principal self induction $L^1$ and $L^2$ directly actuated by the Hertzian waves, a tuning condenser C and inductively excites a secondary $L'$ $C'$ which, like the remainder of the receiver is enclosed in a Faraday cage O. The coupling self induction forming part of the primary circuit is formed by two identical coils $a$, $b$, similarly coupled with the secondary self induction coil $L'$, and wound in such manner that their inductive effects due to the current circulating about the frame, are added with respect to the secondary. The central point N of the conductor connecting the coils $a$, $b$ is connected to the Faraday cage O, so that the primary circuit is thus formed of two halves $L_1$ and $a$ and $L_2$ and $b$, electrically identical and symmetrical with respect to the condenser C and with the ground M.

The object sought by this arrangement is as follows: First, the secondary $L$ $L'$ $C'$ and the entire receiver actuated by this secondary is shielded by the Faraday cage O from the direct influence of the adjacent sending station (Fig. 1), so that the noise of this station cannot be transmitted except through the rotating frame $L_1$ $L_2$.

This accomplished, the frame should be considered from a double viewpoint.

The closed normal circuit $a$ $b$ $L^2$ $C$ $L^1$ is first distinguished; the magnetic flux due to the emission from the station E and engaged by this circuit creates there an electromotive force and a current I which acts inductively on the secondary. In the present application it is sought to direct the frame so as to render the engaged flux, and hence the disturbing current I, minimum.

It is to be further noted that a true open antenna, formed by the frame and its connections with the ground is necessarily superposed with relation to the closed circuit. In ordinary mounting this open antenna exerts on the secondary and the remainder of the receiver an action, generally electrostatic which would be detrimental to the present application. In the balanced mounting of Fig. 3 this action is eliminated, in fact, the variations in potential of the small self inductions $a$ $b$ connected to the ground are weak, and all of the rest of the frame is outside the Faraday cage and there is practically no electrostatic action between the primary and secondary circuits. On the other hand, equal currents $i_a$ $i_b$ circulate between the frame and the ground, but by reason of the arrangements described for the coils $a$ and $b$, the electromotive force created in the secondary $L$ $L'$ by the coil $a$ traversed by the current $i_a$ immediately nullifies that created by the current $i_b$ traversing the coil $b$. The action of the open antenna on the receiver is hence zero.

The noise caused by the sending station adjacent is thus reduced to the inductive effect of the normal current I, due to the variation of the flux engaged by the closed frame.

The selective effect of the frame is thus carried to its maximum efficiency; first, since by directing it so as to reduce the flux engaged it is possible to eliminate or at least to materially reduce the noise, then by eliminating the disturbing action of the open antenna, usually but slightly deadened, the syntonic phenomena are more marked and permit of the profiting from the discords existing between the wave emitted through the sending station E and that of the signal for which receiver B is standing by for.

The same arrangements may be applied to the secondary $L'$ $C'$ as well as to the resonators.

2. The transmitting apparatus must be constructed in such a manner that it will have a symmetry plane to which the radiated magnetic field will be at right angles; and as a receiver there must be employed a closed and balanced frame which is to be placed in the vicinity of the symmetry plane and must be directed at right angles to the latter.

Under these conditions the frame will contain the magnetic vector of the field and will therefore be sheltered from its action.

3. If this symmetry of the transmitting apparatus cannot be completely carried into effect (which is more particularly the case with existing apparatus), then there must be employed as the receiver a balanced frame the plane of which is inclined in such a manner as to contain the vector of the radiated magnetic field, or at least the component of the field vector corresponding to the main wave.

4. The residual action which in spite of the foregoing precautions might still remain in the receiving apparatuses, should be cancelled by means of a compensating aerial actuated from a distance by the transmitting apparatus and acting in its turn upon the receiving apparatus; this compensating aerial being constructed and placed in such a manner that it will not change in any way the syntonic, directional or other properties of the receiving apparatus.

5. One or more of the residual effects subsisting in the receiving apparatuses must be varied in amount and phase, in such a manner as to render the total sum of these residual effects equal to nil.

A description is hereinafter given by way of example, of a number of apparatus which allow of fulfilling the above stated conditions, and of a number of schemes of mounting which have appeared to be the best for attaining the desired result.

The accompanying drawings illustrate these apparatus and these mountings.

I. *Arrangement of a transmitting apparatus having a symmetry plane.*—The magnetic field produced by a transmitting apparatus is due to the energy that is radiated not only by the aerial but also by all the conductors actuated by it (standards, supports, adjacent aerial lines, etc.). Further, the number of waves that are emitted is generally a multiple (coupling waves, harmonic waves, multiple resonance waves, waves due to the fact that an aerial however well constructed it may be, can never be considered as a simple oscillator), so that at each point of the surrounding space the radiated magnetic field cannot be represented by a single vector, but must be represented by a group of vectors; each vector revolves in a plane with a velocity corresponding to the frequency of the wave by which it is produced; these different planes of rotation do not generally coincide with one another.

Nevertheless, according to the present invention, a transmitting apparatus may be constructed having a plane of symmetry, and such that at each point of this plane all the vectors instead of rotating in the planes, oscillate according to one and the same fixed direction in space; this direction is at right angles to the symmetry plane of the transmitting apparatus.

For this purpose (Fig. 1) the transmitting aerial, as likewise all the adjacent conductors actuated by it with a sufficient intensity (lines, standards), are so constructed that to each one of their elements $(aa)$ there corresponds another element $(a'\ a')$ which is geometrically symmetrical in relation to a plane $zxx'$, and that the currents passing through $(aa)$ and $(a'\ a')$ are at every instant equal and in the same direction. This result will be obtained by the equalization of the electric and geometric characteristics of the two elements $(aa,\ a'\ a')$. Under these conditions the magnetic field at any point of the symmetry plane will be represented by vectors at right angles to said plane irrespective of the frequency of the oscillations of the transmitting aerial.

If a closed frame B serving as a receiving aerial be placed in the neighbourhood of the symmetry plane of the transmitting aerial, and be directed at right angles to said plane, and if further a perfect electric balance of this frame be effected by one of the methods described in my co-pending U. S. application for patent Serial No. 249,910, filed in 1918, Patent No. 1,429,572, it will not be capable of transmitting to other receiving apparatuses any action originating from the transmitting apparatus.

Figure 1:
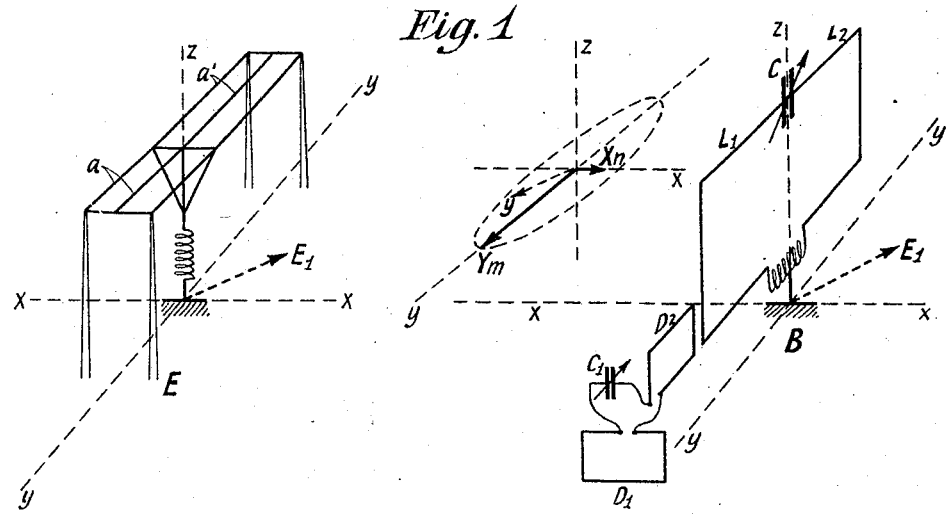

Consequently the system illustrated diagrammatically in Fig. 1 will be adopted for the duplex station. E is the transmitting station; it has a plane of symmetry $zxx'$ which is directed at right angles or approximately at right angles to the direction $EE_1$ of the distant duplex station $E_1$. The balanced receiving frame B is placed in such a manner as to have its centre approximately in the plane $zxx'$ and to be directed at right angles to said plane.

II. *Inclination of the receiving aerial when the corresponding transmitting apparatus has no symmetry plane* (general case of the transmitting apparatuses at present in use).—In this case, as above stated, the magnetic field at each point can be represented by a group of vectors each rotating in a plane. The vector corresponding to the main wave radiated by the transmitting aerial is naturally by far the most important, and in modern installations the other vectors are sufficiently small that the oscillations by which they are produced, will be eliminated at the receiving station by syntonic adjustment.

The effect of the vector due to the main wave which alone is to be considered, will be annulled by making the plane of the receiving frame coincide with the plane of rotation of the said vector. This leads generally to inclining the plane of the frame to the vertical by an angle determined by trial.

Under these conditions a well balanced receiving frame will be practically protected from the influence of the corresponding transmitting apparatus. This is a second solution of the problem.

III. *Annulation of the induced residual electromotive force by means of an auxiliary compensating circuit.*—This annulation may be produced in the case where the receiving circuit is a frame closed by the device illustrated in Fig. 1.

B is the receiving frame which is directed and which is first inclined with all the desired precision in such a manner as to reduce to a minimum the inconvenience caused to the listening by the emission of the adjacent apparatus; this inconvenience being increased for instance by the intensity of the sound in telephonic listening devices. There still remains in many cases a residual disturbing effect that may be considered as being due to the electro-motive force induced by a magnetic component (Xn) oscillating along a line ($x$) at right angles to the plane of the frame. If the precautions (balancing, etc.) above referred to have been sufficiently observed, this component will be considerably smaller than the component (Y) contained in the plane of the frame and rotating in the said plane. It is proposed according to the present invention to utilize the action of the component (Y) for annulling the disturbance due to the component (X). With this object two compensating coils $D_1\ D_2$ are mounted in series with a condenser ($C^4$) in such a manner as to constitute an oscillating closed circuit. $D_1$ is directed at right angles to the direction ($Ym$) which is occupied by the component (Y) when the latter has its maximum value. This coil is therefore subjected in a maximum degree to the induction of the radiation of the apparatus (E). On the other hand its direct inductive action upon the receiver is absolutely nil. The plane of ($D_2$) is on the contrary coincident with the plane of the frame B. This coil which is practically sheltered from the radiation of the transmitting apparatus (E), is coupled inductively to the receiving frame.

Calculation and practice have shown that there are an infinity of ways of choosing the number of turns, the surface, the self-induction and the resistance of the coils ($D_1$ $D_2$), as also the capacity of the circuit in such a manner that the oscillation induced in the compensating circuit ($D_1$ $D_2$ C), and transmitted by it to the receiver (B), shall annul exactly the residual electromotive force remaining in the latter, even when the receiver is adjusted to catch a wave that is equal to or very closely equal to the wave radiated from the station (E). This first result can only be obtained with a well balanced frame.

It will be understood by reason of the arrangement adopted for the compensating circuit, that surface and the number of turns of the winding (D) (hence the action of the emitting apparatus upon the compensator) can be increased without the direct action of the said winding upon the receiving frame which is always nil, being increased in any way. This allows of diminishing as much as is desired, the coupling of the winding ($D_2$) with the frame (B). The qualities of the receiver as regards syntony, its directional qualities, and others, will therefore be much less affected by this correcting means than they would be by any of those that are at present in use.

The same effect might be obtained with a single compensating winding which would be suitably chosen and directed, replacing the whole ($D_1$, $D_2$) and coupled inductively to the receiving frame (B), because the effect of two windings can always be produced by a single suitably chosen and directed winding.

IV. *Annulation of the residual effects subsisting in the receiver, by acting upon one or more of them so as to compensate the others as regards amount and phase.*— As has been shown above, the entire receiver frame must be considered as a closed antenna and as an open antenna at the same time; this dual state is inevitable.

Up to the present, the applicant has attempted by seperate means to annul the disturbing oscillation generated in the closed aerial, and to stop the transmission to the detecting devices of the effects due to the disturbing oscillation generated in the open aerial.

But there is another way, and by a suitable regulation of the circuits it can be arranged that the disturbing actions of these two aerials upon the detecting apparatus shall balance one another exactly.

In other words, the open antenna formed by the frame itself should replace the separate compensating circuit $D_1$ $D_2$ shown on Fig. 2.

Figure 3:
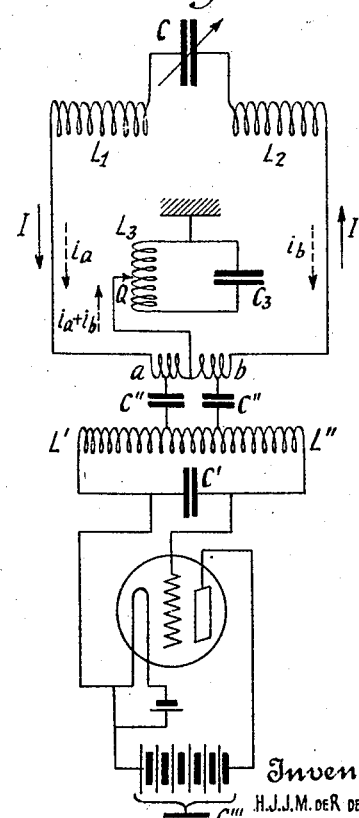
Fig. 3 is a view indicating the manner in which the receiver element may itself be used as a compensating element.

This result may be attained by different methods; Fig. 3 shows an example which consists in introducing a resonator $L_3$ $C_3$ on the conductor connecting the centre N of the frame with the ground.

The operation and manipulation of this mounting is as follows:

The frame being tuned to the signal to be received and directed so as to reduce the disturbing actions caused by the adjacent sender E to as great a degree as possible, the magnetic flux created by the emitter or sending station through the closed circuit $L_1$ $L_2$ C is not generally nullified at once. The residual current I due to the periodical variation of said flux induces in the secondary L' C' a certain electromotive force. A sin ($wt+e$) represents the pulsation ($2\pi$ times the frequency) of the emission E: the amplitude A is proportional to the flux engaged; the phase $e$ is fixed by the condition that the circuit $L_1$ $L_2$ C is compulsorily tuned to the signal to be received, but the operator may, at will, modify $e$ 180° by turning the frame a half turn.

It is desired to compensate this electromotive force. A sin ($wt+e$) by another B sin ($wt+\psi$) created by the frame acting as an open aerial; this condition requires that there be obtained simultaneously (1) B=A $\psi=e+180$.

Now, the open aerial is composed of two semi-coils $L_1$ $L_2$ which form a sort of terminal capacity, of the resonator $L_3$ $C_3$ and of the ground; this aerial exerts on the secondary L' C' an electrostatic action, proportional on the one hand to the capacities C'' between the primary and the secondary, and on the other, the tension developed between the point N and the ground. This action, the pulsation of which is necessarily equal to that $w$ of the sending station E, can only be represented by the formula B sin ($wt+\psi$). To balance the inequalities (1) it is necessary only to be able to regulate separately the amplitude B and the phase $\psi$; this is effectively possible.

On the one hand, the manipulation of the condensor $C_3$ permits of imparting to the phase $\psi$ a continuous variation capable of attaining 180°; thus to reproduce the value ($e+180$), which is itself determined only at 180°, the frame is given a half turn. On the other hand the movement of the slide Q acts directly on the potential of the point N, then on the amplitude B: the two inequalities (1) may thus be balanced. Regulation is effected by successive approximations, based on telephonic indications; the disturbances of station E could not be heard.

What I claim is:—

1. In a station for duplex radio telegraphy, a receiver comprising a secondary circuit and a balanced receiver frame coupled thereto, said frame comprising in series a principal self induction capable of being directed and serving as a closed aerial, a tuned condenser and a coupling coil inductively coupling the frame with the secondary circuit, the center of the coupling coil being connected to the ground and the circuit of the frame being electrically symmetrical with respect to this ground, and a Faraday cage enclosing the whole of the receiver circuit, with the exception of the movable self induction and the tuned condenser of the frame.

2. In a station for duplex wireless signalling, in combination, a receiving antenna of the loop type and a sending antenna, said receiving antenna being so arranged as to have its plane inclined to the vertical in such a manner as to effect coincidence between the said plane and the plane of rotation of the vector representating the magnetic flux emanating from the sending antenna.

3. In a duplex radio signalling system the combination of a transmitter and a receiving system including a loop aerial in the same locality disposed in a line substantially perpendicular to the direction of said transmitter, and means cooperating with said loop for compensating for any unsymmetrical relations between it and the conductors of the transmitter having oscillations induced therein.

4. In a duplex radio signalling system the combination of a transmitter and a receiving system including a loop aerial in the same locality disposed in a line substantially perpendicular to the direction of said transmitter, and a directional collector coupled to said loop cooperating with said first mentioned loop for compensating for any unsymmetrical relations between said loop and the conductors of the transmitter having oscillations induced therein.

5. In a duplex radio signalling system the combination of a transmitter and a receiving system including a loop aerial in the same locality disposed in a line substantially perpendicular to the direction of said transmitter, said loop aerial having a tuning condenser and a coupling coil symmetrically disposed in series in said loop and means cooperating with said loop for compensating for any unsymmetrical relations between it and the conductors of the transmitter having oscillations induced therein.

6. In a duplex radio signalling system the combination of a transmitter and a receiving system including a loop aerial in the same locality disposed in a line substantially perpendicular to the direction of said transmitter, said loop aerial having a tuning condenser and a coupling coil symmetrically disposed respectively in the upper and lower conductors and in series in said loop, a secondary receiving circuit, a Faraday cage enclosing the secondary circuit and the coil, and a directional auxiliary collector associated with said loop for compensating for any unsymmetrical relations between said loop and the conductors of the transmitter having oscillations induced therein.

7. In a duplex radio signalling system the combination of a transmitter and a receiving system including a loop aerial disposed in a line substantially perpendicular to the direction of said transmitter, said loop aerial having a tuning condenser and a coupling coil symmetrically disposed in series in said loop, a ground connection to the middle point of said coil, said transmitter having elements disposed substantially symmetrically with respect to said loop, and means cooperating with said loop for compensating for the unsymmetrical relations between said loop and said transmitter.

8. In a duplex radio signalling system, the combination of a transmitter and a receiving system including a loop aerial disposed in a line substantially perpendicular to the direction of said transmitter, said loop aerial having a tuning condenser and a coupling coil symmetrically disposed in series in said loop, a ground connection to the middle point of said coil, said transmitter having elements disposed substantially symmetrically with respect to the direction of said loop and a second directional aerial coupled to said loop cooperating with said first mentioned loop for compensating for the unsymmetrical relations of said loop and said transmitter elements.

9. In a duplex radio signalling system, the combination of a transmitter and a receiving system including a loop aerial disposed in a line substantially perpendicular to the direction of said transmitter, said loop aerial having a tuning condenser and a coupling coil symmetrically disposed in series in said loop, a ground connection to the middle point of said coil, said transmitter having elements disposed substantially symmetrical with respect to said loop, and a pair of auxiliary loop aerials at right angles to each other cooperating with said first mentioned loop for compensating for the unsymmetrical relations of said loop and said transmitter elements.

10. In a duplex radio signalling system, the combination of a transmitter and a receiving system including a loop aerial disposed in a line substantially perpendicular to the direction of said transmitter, said loop aerial having a tuning condenser and a coupling coil symmetrically disposed in series in said loop, a secondary circuit coupled to said coil, a ground connection to the middle point of said coil, said transmitter having elements disposed substantially symmetrically with respect to the direction of said loop, means cooperating with said loop for compensating for the unsymmetrical relation of said loop and said transmitter elements and a Faraday cage enclosing the secondary circuit and the aerial coil.

In testimony whereof I have signed my name to this specification.

HENRI JEAN JOSEPH MARIE
    de REGNAULD de BELLESCIZE.